United States Patent
Polaganga et al.

(10) Patent No.: US 12,177,888 B2
(45) Date of Patent: *Dec. 24, 2024

(54) WIRELESS COMMUNICATION NETWORK ACCESS FOR WIRELESS USER EQUIPMENT BASED ON THEIR WIRELESS NETWORK SLICES

(71) Applicant: T-MOBILE INNOVATIONS LLC, Overland Park, KS (US)

(72) Inventors: Roopesh Kumar Polaganga, Bothell, WA (US); Deepak Nadh Tammana, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,267

(22) Filed: Sep. 1, 2023

(65) Prior Publication Data

US 2023/0413316 A1    Dec. 21, 2023

Related U.S. Application Data

(63) Continuation of application No. 17/466,942, filed on Sep. 3, 2021, now Pat. No. 11,785,636.

(51) Int. Cl.
*H04W 72/566* (2023.01)
*H04W 72/1263* (2023.01)

(52) U.S. Cl.
CPC ..... *H04W 72/569* (2023.01); *H04W 72/1263* (2013.01)

(58) Field of Classification Search
CPC ......... H04W 72/1242; H04W 72/1263; H04W 28/26; H04W 72/0446; H04W 72/23; H04W 72/27; H04W 24/02; H04W 24/04; H04W 72/542; H04W 72/04; H04W 72/12; H04L 1/08; H04L 5/0035; H04L 5/0078; H04L 41/0894; H04L 41/5019; H04L 41/5067; H04L 47/781; H04L 5/00; H04B 7/026
USPC ........................................................ 455/450
See application file for complete search history.

(56) References Cited

U.S. PATENT DOCUMENTS

| | | |
|---|---|---|
| 8,305,972 B2 | 11/2012 | Baker et al. |
| 8,879,479 B2 | 11/2014 | Baker et al. |
| 8,913,997 B2 * | 12/2014 | Singh .................. H04L 65/1083 455/414.1 |
| 8,982,846 B2 | 3/2015 | Baker et al. |
| 10,091,784 B1 | 10/2018 | Liu et al. |

(Continued)

FOREIGN PATENT DOCUMENTS

| | | | | |
|---|---|---|---|---|
| EP | 3735084 A1 * | 11/2020 | ............ | H04W 24/10 |
| WO | WO-2017027128 A1 * | 2/2017 | .............. | H04J 11/00 |

(Continued)

*Primary Examiner* — Nathan S Taylor

(57) ABSTRACT

A wireless access node detects contention among User Equipment (UEs) for wireless resources. The wireless access node prioritizes individual UEs based on the wireless network slices used by the individual UEs. The wireless access node allocates the wireless resources to the individual UEs based on the prioritization. The wireless access node wirelessly communicates between the wireless network slices and the UEs over the allocated wireless resources.

20 Claims, 9 Drawing Sheets

(56) References Cited

U.S. PATENT DOCUMENTS

| | | | |
|---|---|---|---|
| 2014/0295865 A1* | 10/2014 | Fantaye | H04W 52/0219 |
| | | | 455/450 |
| 2017/0331670 A1* | 11/2017 | Parkvall | H04W 52/0251 |
| 2018/0077720 A1* | 3/2018 | Wang | H04W 72/54 |
| 2018/0139636 A1* | 5/2018 | Kollar | H04L 43/0888 |
| 2018/0324635 A1* | 11/2018 | Babaei | H04W 74/0891 |
| 2019/0029065 A1* | 1/2019 | Park | H04W 8/08 |
| 2019/0124571 A1* | 4/2019 | Kong | H04W 36/02 |
| 2019/0132882 A1* | 5/2019 | Li | H04W 74/0833 |
| 2019/0320322 A1 | 10/2019 | Jayawardene et al. | |
| 2019/0349981 A1* | 11/2019 | Sandberg | H04L 5/0055 |
| 2019/0356450 A1* | 11/2019 | He | H04W 72/20 |
| 2019/0373520 A1* | 12/2019 | Sillanpää | H04W 24/02 |
| 2020/0037219 A1 | 1/2020 | Kumar et al. | |
| 2020/0059959 A1* | 2/2020 | Turtinen | H04W 74/006 |
| 2020/0196327 A1* | 6/2020 | Zhang | H04W 72/21 |
| 2020/0367109 A1* | 11/2020 | Chen | H04W 28/18 |
| 2021/0185738 A1* | 6/2021 | John | H04W 76/30 |
| 2021/0306241 A1* | 9/2021 | Ramalingam | H04L 43/0888 |
| 2021/0337553 A1* | 10/2021 | Chong | H04W 24/02 |
| 2021/0359912 A1* | 11/2021 | Tervonen | H04W 28/16 |
| 2022/0078662 A1* | 3/2022 | Wang | H04L 65/80 |
| 2022/0078768 A1* | 3/2022 | El Hamss | H04L 5/0055 |
| 2022/0085924 A1* | 3/2022 | Talarico | H04L 1/1854 |
| 2022/0109532 A1* | 4/2022 | Talarico | H04L 5/001 |
| 2022/0124571 A1* | 4/2022 | Jung | H04W 48/18 |
| 2022/0232605 A1* | 7/2022 | Kim | H04W 76/28 |
| 2022/0272746 A1* | 8/2022 | Sevindik | H04L 1/1864 |
| 2022/0287051 A1* | 9/2022 | Panchal | H04W 72/23 |
| 2022/0295349 A1* | 9/2022 | Han | H04W 28/16 |
| 2022/0303108 A1* | 9/2022 | Faxér | H04L 5/1461 |
| 2022/0312481 A1* | 9/2022 | Talarico | H04W 74/0866 |
| 2022/0345870 A1* | 10/2022 | Knudsen | H04W 76/10 |
| 2023/0010010 A1* | 1/2023 | Shukla | G06N 3/08 |
| 2023/0025131 A1* | 1/2023 | Gandhi | H04W 28/0958 |
| 2023/0422085 A1* | 12/2023 | Babbellapati | H04W 28/0268 |
| 2024/0064817 A1* | 2/2024 | Löhr | H04W 74/0833 |

FOREIGN PATENT DOCUMENTS

| | | | | |
|---|---|---|---|---|
| WO | WO-2017089864 A1 * | 6/2017 | | G06F 16/22 |
| WO | WO-2019160967 A1 * | 8/2019 | | |
| WO | WO-2020125941 A1 * | 6/2020 | | H04L 1/08 |
| WO | WO-2021136578 A1 * | 7/2021 | | H04L 5/0048 |
| WO | WO-2021242151 A1 * | 12/2021 | | G06N 3/0442 |
| WO | WO-2022015014 A1 * | 1/2022 | | H04W 36/06 |
| WO | WO-2022086221 A1 * | 4/2022 | | H04W 48/18 |
| WO | WO-2022177391 A1 * | 8/2022 | | H04W 48/18 |
| WO | WO-2022185214 A1 * | 9/2022 | | H04W 74/006 |
| WO | WO-2022225952 A1 * | 10/2022 | | |

* cited by examiner

WIRELESS COMMUNICATION NETWORK ACCESS FOR WIRELESS USER EQUIPMENT BASED ON THEIR WIRELESS NETWORK SLICES

RELATED CASES

This United States Patent Application is a continuation of U.S. patent application Ser. No. 17/466,942 that was filed on Sep. 3, 2021 and is entitled "WIRELESS COMMUNICATION NETWORK ACCESS FOR WIRELESS USER EQUIPMENT BASED ON THEIR WIRELESS NETWORK SLICES." U.S. patent application Ser. No. 17/466,942 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless network elements comprise Interworking Functions (IWFs), Access and Mobility Management Functions (AMFs), Session Management Functions (SMFs), User Plane Functions (UPFs), and the like. The UPFs are often optimized for a specific service, and the optimized UPFs form a wireless network slice that delivers the service.

Uplink proactive scheduling keeps the radio link between a wireless user device and a wireless access node active by having the access node allocate uplink grants before the wireless user device has data to send. Uplink proactive scheduling enables the wireless user devices to send user data over their uplink immediately without waiting for a request/grant process. The time-savings lowers latency & jitter, but proactive uplink scheduling consumes more wireless network resources. Unfortunately, the wireless access nodes inefficiently use uplink proactive scheduling and waste wireless network resources. Moreover, the wireless access nodes do not effectively use slice information to prioritize UE scheduling—especially during periods of resource contention.

TECHNICAL OVERVIEW

In some examples, a wireless access node detects contention among User Equipment (UEs) for wireless resources. The wireless access node prioritizes individual UEs based on wireless network slices used by the individual UEs. The wireless access node allocates the wireless resources to the individual UEs based on the prioritization. The wireless access node wirelessly communicates between the wireless network slices and the UEs over the allocated wireless resources.

In some examples, a Radio Resource Control (RRC) determines wireless network slices used by individual wireless UEs. A Media Access Control (MAC) detects contention among the individual wireless UEs for the wireless resource blocks. The RRC indicates the wireless network slices used by the individual wireless UEs to the MAC. The MAC prioritizes the individual UEs based on the wireless network slices used by the individual UEs. The MAC allocates the wireless resource blocks to the individual UEs based on the prioritization.

DETAILED DESCRIPTION

Figure 1:
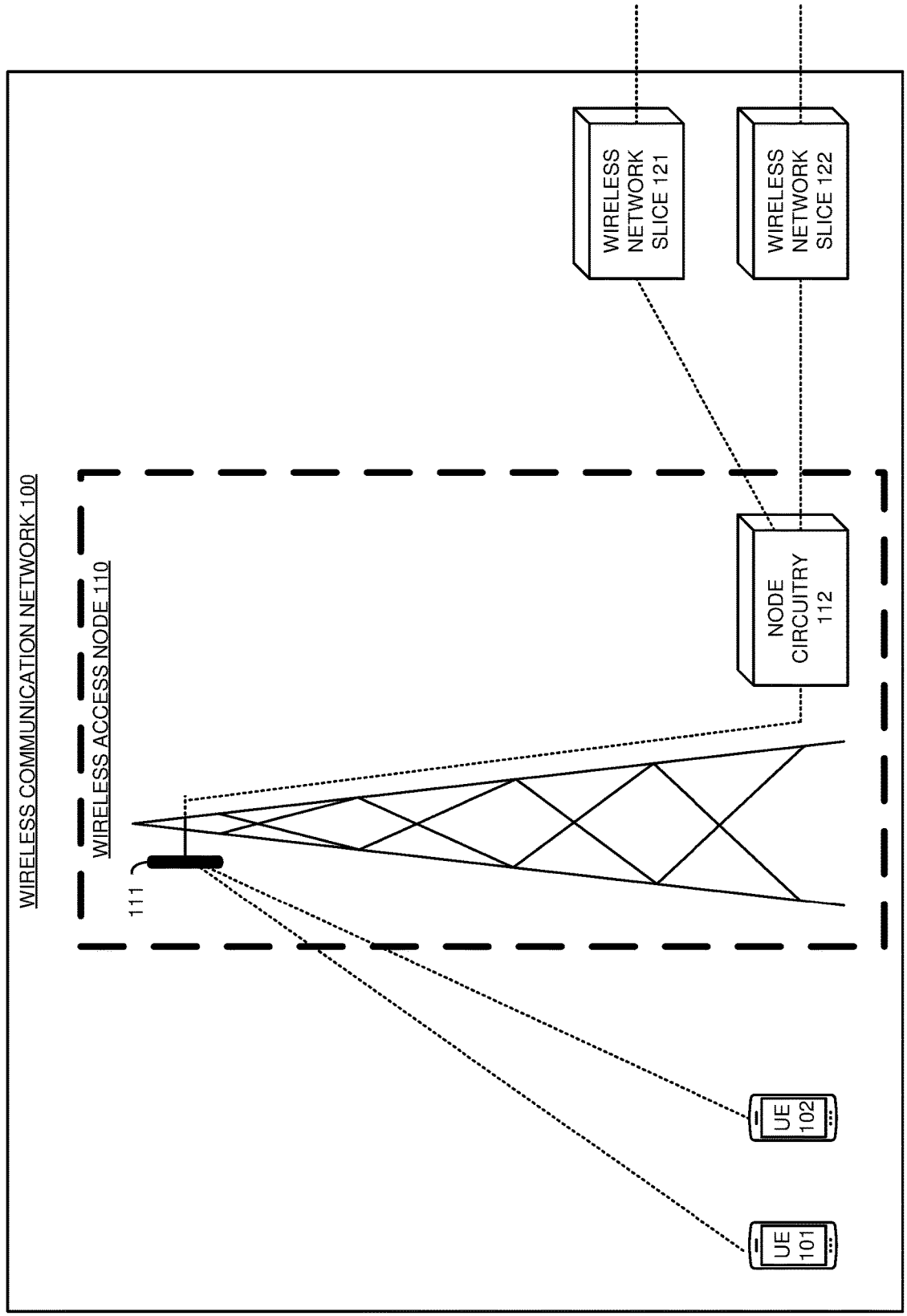
FIG. 1 illustrates an exemplary wireless communication network comprising an exemplary wireless access node to serve wireless User Equipment (UEs) based on wireless network slices that are used by the wireless UEs.

FIG. 1 illustrates exemplary wireless communication network 100 comprising exemplary wireless access node 110 to serve wireless User Equipment (UEs) 101-102 based on wireless network slices 121-122 that are used by wireless UEs 101-102. Wireless communication network 100 comprises UEs 101-102, wireless access node 110, and wireless network slices 121-122. Wireless access node 110 comprises radio circuitry 111 and node circuitry 112. UEs 101-102 comprise computers, phones, vehicles, sensors, robots, or some other data appliances with wireless communication circuitry. Exemplary wireless data services include machine-control, internet-access, media-streaming, social-networking, and/or some other networking product. Wireless communication network 100 is simplified for clarity and typically includes more UEs, access nodes, and network slices than shown.

Various examples of network operation and configuration are described herein. In some examples, node circuitry 112 generates initial schedules for UEs 101-102. For example, a Media Access Control (MAC) may individually allocate future resource blocks to UEs 101-102. Radio circuitry 111 wirelessly communicates with UEs 101-102 based on the initial schedules. UE 101 communicates over wireless access node 110 and wireless network slice 121. UE 102 communicates over wireless access node 110 and wireless network slice 122. Node circuitry 112 detects a scheduling contention for UEs 101-102. For example, the MAC may detect a lack of enough future resource blocks for UEs 101-102. In response to the contention, node circuitry 112 determines scheduling priority based on wireless network slices 121-122 used by UEs 101-102. For example, a Radio Resource Control (RRC) may signal the MAC that UE 101 is using slice 121 and UE 102 is using slice 122—and the MAC could enter a data structure with slices 121-122 to yield a higher priority for UE 102 and slice 122 than for UE 101 and slice 121. Node circuitry 112 then generates priority schedules for UEs 101-102 based on the scheduling priority. For example, the MAC may allocate more future resource blocks to UE 102 due to the priority of slice 122. Radio circuitry 111 wirelessly communicates with the UEs 101-102 based on the priority schedules. When the contention subsides, node circuitry 112 may revert to normal scheduling.

In some examples, node circuitry 112 proactively schedules uplink resource blocks to UEs 101-102, and UEs 101-102 may use the uplink resource blocks without additional requests. Node circuitry 112 detects contention for the uplink resource blocks and prioritizes UEs 101-102 based on which slices 121-122 they use. Node circuitry 112 proactively schedules uplink resource blocks for UEs 101-102 based on their priority. Thus, the higher-priority UE still uses proactively-scheduled uplink resource blocks without additional requests, while the lower-priority UE must now request uplink resource blocks. Node circuitry 112 may proactively schedule and prioritize downlink resource blocks in a similar manner.

In some examples, node circuitry 112 prioritizes UEs 101-102 by processing slice IDs, slice types, and/or slice amounts. If UE 101 is using slices 121-122 while UE 102 is only using slice 122, then UE 101 receives priority over UE 102 based on its greater amount of network slices. Node circuitry 112 may host a data structure that prioritizes slice IDs and/or slice types. For example, node circuitry 112 could store an ordered-list that prioritizes a low-latency slice type and/or a fixed wireless slice type over other slice types.

Advantageously, wireless access node 110 efficiently uses scheduling (including uplink proactive scheduling) to conserve wireless network resources. Moreover, wireless access node 110 effectively uses slice information for UEs 101-102 to prioritize UE scheduling during periods of resource contention. UEs 101-102 and wireless access node 110 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. Wireless access node 110, wireless network slices 121-122, and external systems communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UEs 101-102 and wireless access node 110 include radios. UEs 101-102, wireless access node 110, and slices 121-122 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
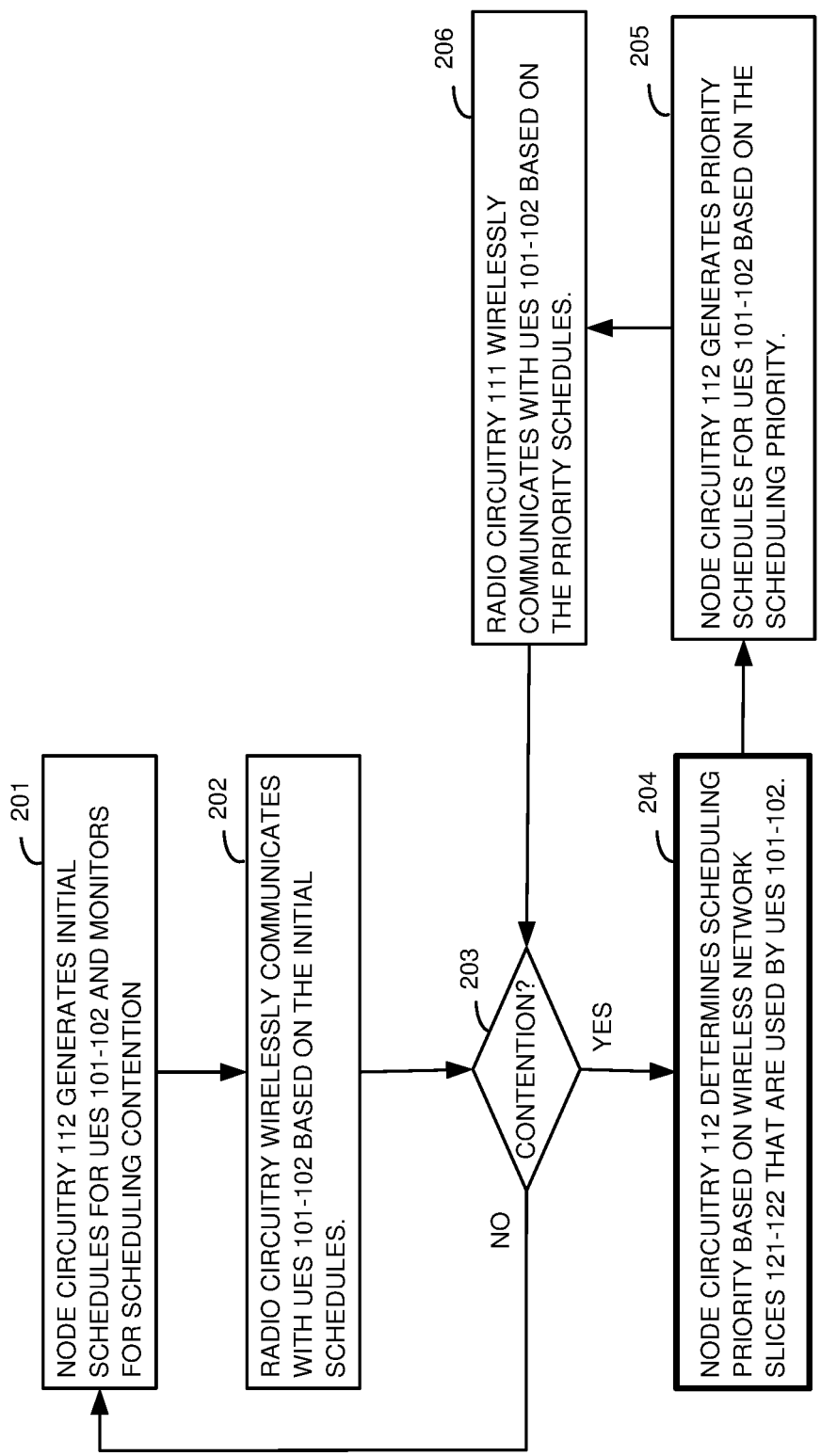
FIG. 2 illustrates an exemplary operation of the wireless communication network comprising the exemplary wireless access node to serve the wireless UEs based on the wireless network slices that are used by the wireless UEs.

FIG. 2 illustrates an exemplary operation of wireless communication network 100 comprising exemplary wireless access node 110 to serve wireless UEs 101-102 based on wireless network slices 121-122 that are used by wireless UEs 101-102. The operation may differ in other examples. Node circuitry 112 generates initial schedules for UEs 101-102 and monitors for contention (201). Radio circuitry 111 wirelessly communicates with UEs 101-102 based on the initial schedules (202). When node circuitry 112 does not detect a scheduling contention for UEs 101-102 (203), the operation repeats (201). When node circuitry 112 detects a scheduling contention for UEs 101-102 (203), node circuitry 112 determines scheduling priority based on wireless network slices 121-122 used by UEs 101-102 (204). Node circuitry 112 generates priority schedules for UEs 101-102 based on the scheduling priority (205). Radio circuitry 111 wirelessly communicates with the UEs 101-102 based on the priority schedules (206) and the scheduling contention is reassessed (203).

Figure 3:
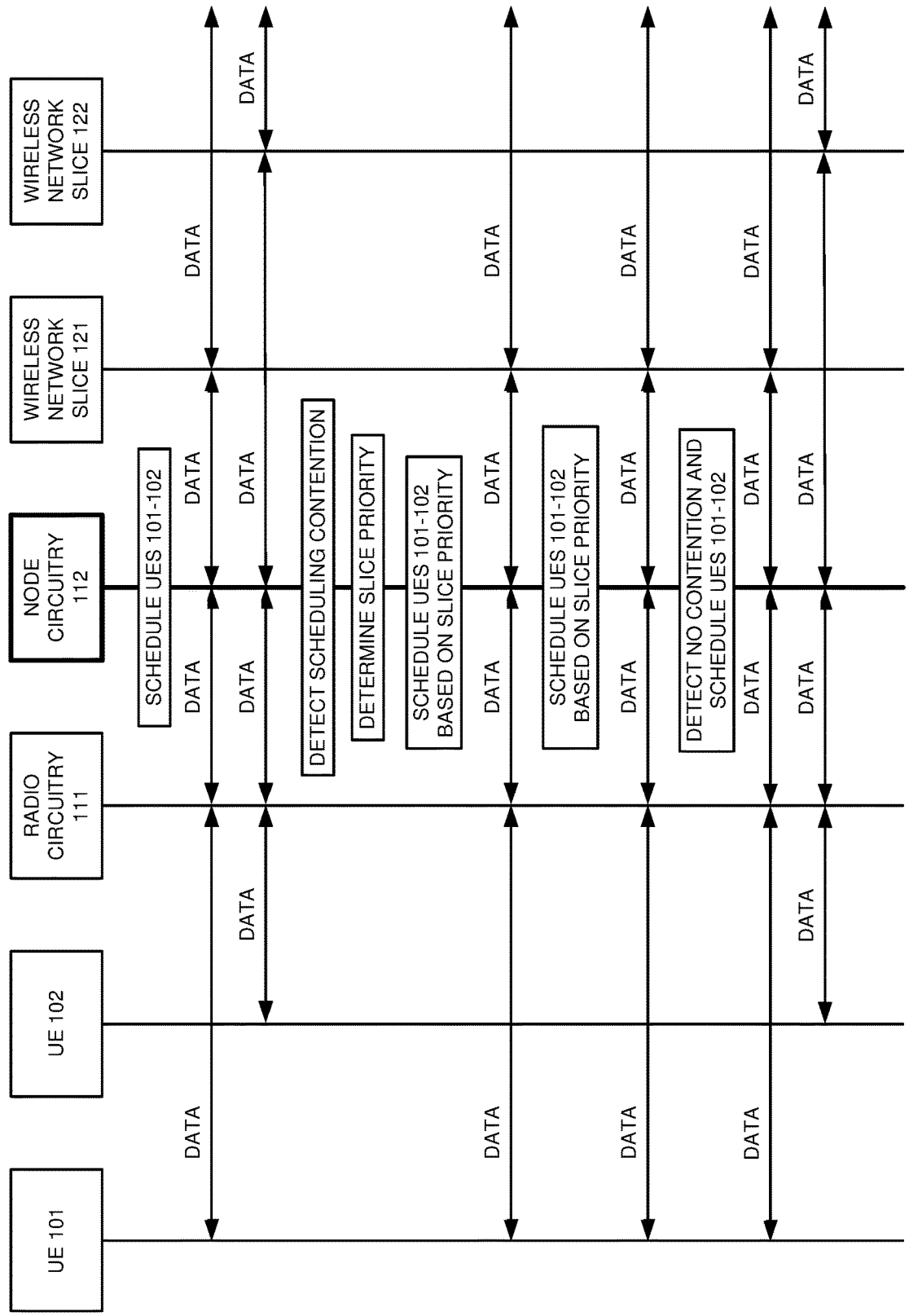
FIG. 3 illustrates an exemplary operation of the wireless communication network comprising the exemplary wireless access node to serve the wireless UEs based on the wireless network slices that are used by the wireless UEs.

FIG. 3 illustrates an exemplary operation of wireless communication network 100 comprising exemplary wireless access node 110 to serve wireless UEs 101-102 based on wireless network slices 121-122 that are used by wireless UEs 101-102. The operation may differ in other examples. Node circuitry 112 schedules UEs 101-102 to transfer data. Per the scheduling, UE 101 wirelessly exchanges data with radio circuitry 111. Radio circuitry 111 and node circuitry 112 exchange the data for UE 101. Node circuitry 112 and wireless network slice 121 exchange the data for UE 101. Wireless network slice 121 and external systems exchange the data for UE 101. Per the scheduling, UE 102 wirelessly exchanges data with radio circuitry 111. Radio circuitry 111 and node circuitry 112 exchange the data for UE 102. Node circuitry 112 and wireless network slice 122 exchange the data for UE 102. Wireless network slice 122 and external systems exchange the data for UE 102.

Node circuitry 112 detects scheduling contention for UEs 101-102 like a lack of uplink resource blocks to proactively-schedule. In response to the contention, node circuitry 112 determines scheduling priority based on wireless network slices 121-122 used by UEs 101-102. Node circuitry 112 now schedules UEs 101-102 based on the scheduling priority which is based on slice priority. Per the priority scheduling, UE 101 wirelessly exchanges data with radio circuitry 111. Radio circuitry 111 and node circuitry 112 exchange the data for UE 101. Node circuitry 112 and wireless network slice 121 exchange the data for UE 101. Wireless network slice 121 and external systems exchange the data for UE 101. Without priority scheduling, UE 102 exchanges no (or minimal) data with radio circuitry 111.

Node circuitry 112 monitors the scheduling contention for UEs 101-102 and continues to schedule UEs 101-102 based on the scheduling and slice priority. Per the priority scheduling, UE 101 wirelessly exchanges data with radio circuitry 111. Radio circuitry 111 and node circuitry 112 exchange the data for UE 101. Node circuitry 112 and wireless network slice 121 exchange the data for UE 101. Wireless network slice 121 and external systems exchange the data for UE 101. Still without priority scheduling, UE 102 exchanges nor or minimal data with radio circuitry 111.

Node circuitry 112 eventually detects when the scheduling contention for UEs 101-102 subsides, and in response, node circuitry 112 returns to normal scheduling. Per the normal scheduling, UE 101 wirelessly exchanges data with radio circuitry 111. Radio circuitry 111 and node circuitry 112 exchange the data for UE 101. Node circuitry 112 and wireless network slice 121 exchange the data for UE 101. Wireless network slice 121 and external systems exchange the data for UE 101. Per the normal scheduling, UE 102 wirelessly exchanges data with radio circuitry 111. Radio circuitry 111 and node circuitry 112 exchange the data for UE 102. Node circuitry 112 and wireless network slice 122 exchange the data for UE 102. Wireless network slice 122 and external systems exchange the data for UE 102.

Figure 4:
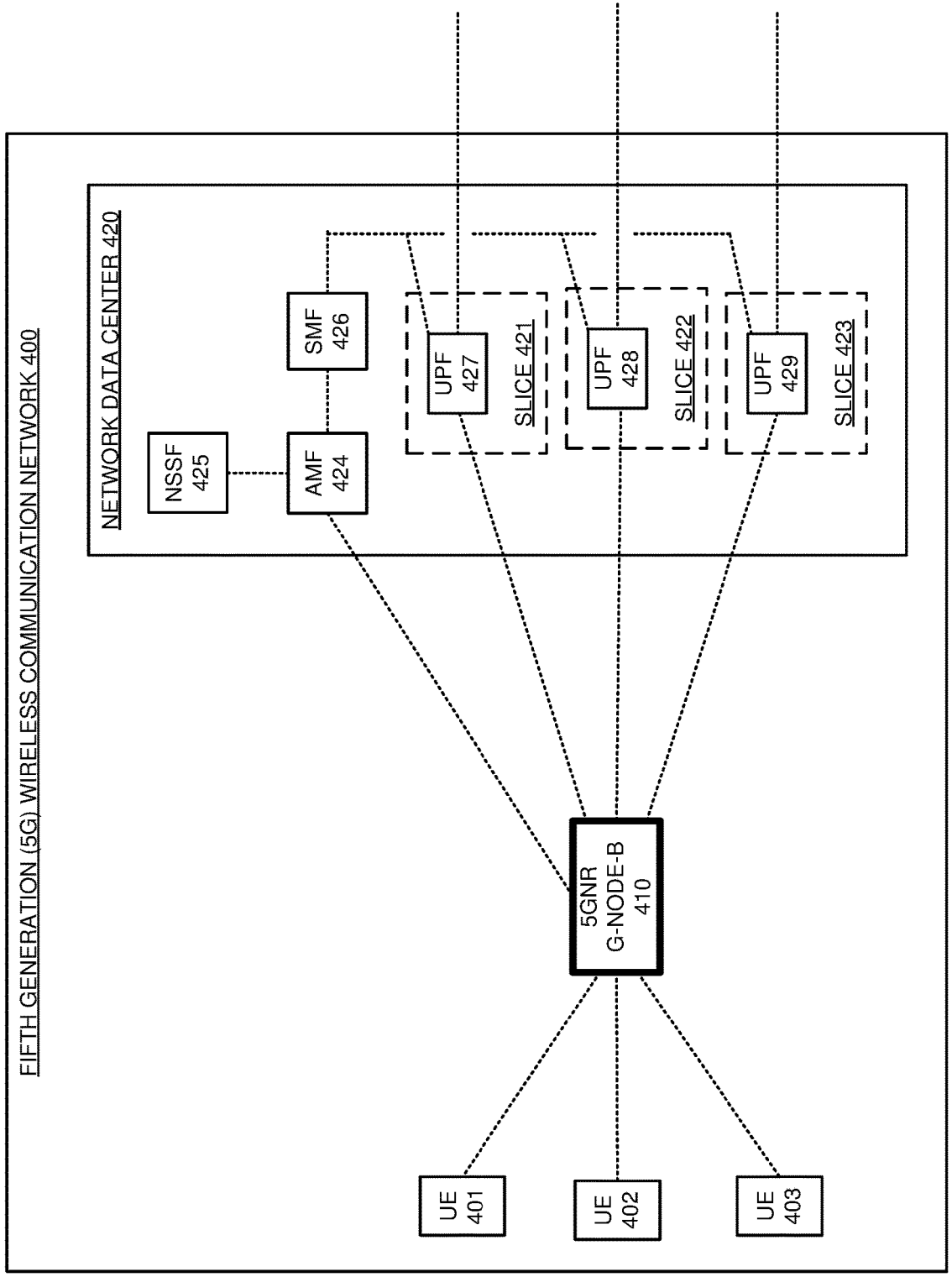
FIG. 4 illustrates an exemplary Fifth Generation (5G) wireless communication network comprising a 5G New Radio (5GNR) gNodeB to serve wireless UEs based on wireless network slices that are used by the wireless UEs.

FIG. 4 illustrates exemplary Fifth Generation (5G) wireless communication network 400 comprising 5G New Radio (5GNR) gNodeB 410 to serve wireless UEs 401-403 based wireless network slices 421-423 that are used by wireless UEs 401-403. 5G wireless communication network 400 comprises an example of wireless communication network 100, although network 100 may differ. 5G wireless communication network 400 comprises: UEs 401-403, 5GNR gNodeB 410, and network data center 420. Network data center 420 comprises wireless network slices 421-423, Access and Mobility Management Function (AMF) 424, Network Slice Selection Function (NSSF) 425, and Session Management Function (SMF) 426. Wireless network slices 421-423 comprise User Plane Functions (UPFs) 427-429.

UE 401 wirelessly attaches to 5GNR gNodeB 410. 5GNR gNodeB 410 transfers initial signaling for UE 401 to AMF 424. AMF 424 authenticates UE 401. AMF 424 and NSSF 425 interact to select slices 421-422 for UE 401. AMF 424 signals SMF 426 to serve slices 421-422 to UE 401 over 5GNR gNodeB 410. SMF 426 signals UPFs 427-428 to serve UE 401 over gNodeB 410. AMF 424 signals 5GNR gNodeB 410 to serve UE 401 over UPFs 427-428. 5GNR gNodeB 410 signals UE 401 to communicate with UPFs 427-428 over 5GNR gNodeB 410. UE 401 exchanges user data with external systems over 5GNR gNodeB 410 and slices 421-422.

UE 402 wirelessly attaches to 5GNR gNodeB 410. 5GNR gNodeB 410 transfers initial signaling for UE 402 to AMF 424. AMF 424 authenticates UE 402. AMF 424 and NSSF 425 interact to select slice 422 for UE 402. AMF 424 signals SMF 426 to serve slice 422 to UE 402 over 5GNR gNodeB 410. SMF 426 signals UPF 428 to serve UE 402 over 5GNR gNodeB 410. AMF 424 signals 5GNR gNodeB 410 to serve UE 402 over UPF 428. 5GNR gNodeB 410 signals UE 402 to communicate with UPF 428 over 5GNR gNodeB 410. UE 402 exchanges user data with external systems over 5GNR gNodeB 410 and slice 422.

UE 403 wirelessly attaches to 5GNR gNodeB 410. 5GNR gNodeB 410 transfers initial signaling for UE 403 to AMF 424. AMF 424 authenticates UE 403. AMF 424 and NSSF 425 interact to select slice 423 for UE 403. AMF 424 signals SMF 426 to serve slice 423 to UE 403 over 5GNR gNodeB 410. SMF 426 signals UPF 429 to serve UE 403 over 5GNR gNodeB 410. AMF 424 signals 5GNR gNodeB 410 to serve UE 403 over UPF 429. 5GNR gNodeB 410 signals UE 403 to communicate with UPF 429 over 5GNR gNodeB 410. UE 403 exchanges user data with external systems over 5GNR gNodeB 410 and slice 423.

To exchange the user data, 5GNR gNodeB 410 schedules uplink and downlink resource blocks for UEs 401-403 per the signaling from AMF 424. UEs 401-403 and 5GNR gNodeB 410 exchange the user data over the scheduled uplink and downlink resource blocks. In this example, UEs 401-403 and 5GNR gNodeB 410 use proactive uplink scheduling where gNodeB 410 automatically schedules uplink resource blocks to UEs 401-403 without UEs 401-403 making repeated requests.

Before UE 403 attaches, 5GNR gNodeB 410 may detect contention for the uplink resource blocks between UEs 401-402 when not enough resource blocks are available to serve proactive uplink scheduling to both UEs 401-402. 5GNR gNodeB 410 then identifies slices 421-422 used by UEs 401-402 and prioritizes UEs 401-402 for proactive uplink scheduling based on the slices that they individually use. If slices 421-422 (used by UE 401) have priority over slice 422 (used by UE 402) based on total amount of slices (2>1), then UE 401 retains proactive uplink scheduling while UE 402 must now request uplink resource blocks. If slice 421 (used by UE 401) has priority over slice 422 (used by UE 402) based on slice ID or type, then UE 401 retains proactive uplink scheduling while UE 402 must now request uplink resource blocks. When the contention subsides, 5GNR gNodeB 410 returns to normal scheduling and both UEs 401-402 receive proactive uplink scheduling.

After UE 403 attaches, 5GNR gNodeB 410 now detects contention for the uplink resource blocks between UEs 401-403 when not enough resource blocks are available to serve proactive uplink scheduling to UEs 401-403. 5GNR gNodeB 410 identifies slices 421-423 used by UEs 401-403 and prioritizes UEs 401-403 for proactive uplink scheduling based on the slices that they individually use. If slices 421-422 (used by UE 401) have priority over slice 422 (used by UE 402) and slice 423 (used by UE 403) based number of slices, then UE 401 retains proactive uplink scheduling while UEs 402-403 request their uplink resource blocks. If slice 423 (used by UE 403) has priority over slices 421-422 (used by UEs 401-402) based on slice ID or type, then UE 403 retains proactive uplink scheduling while UEs 401-402 request their uplink resource blocks. When the contention subsides, 5GNR gNodeB 410 returns to normal scheduling and UEs 401-403 receive proactive uplink scheduling.

5GNR gNodeB 410 may host a data structure that correlates slice IDs and/or slice types with proactive uplink scheduling during contention. For example, a Low-latency slice type or a fixed wireless slice type might be prioritized for proactive uplink scheduling during contention over other slice types. The total amount of slices for a UE may be used as the primary factor or as a tie-breaking factor when prioritizing the UEs during periods of contention.

Figure 5:
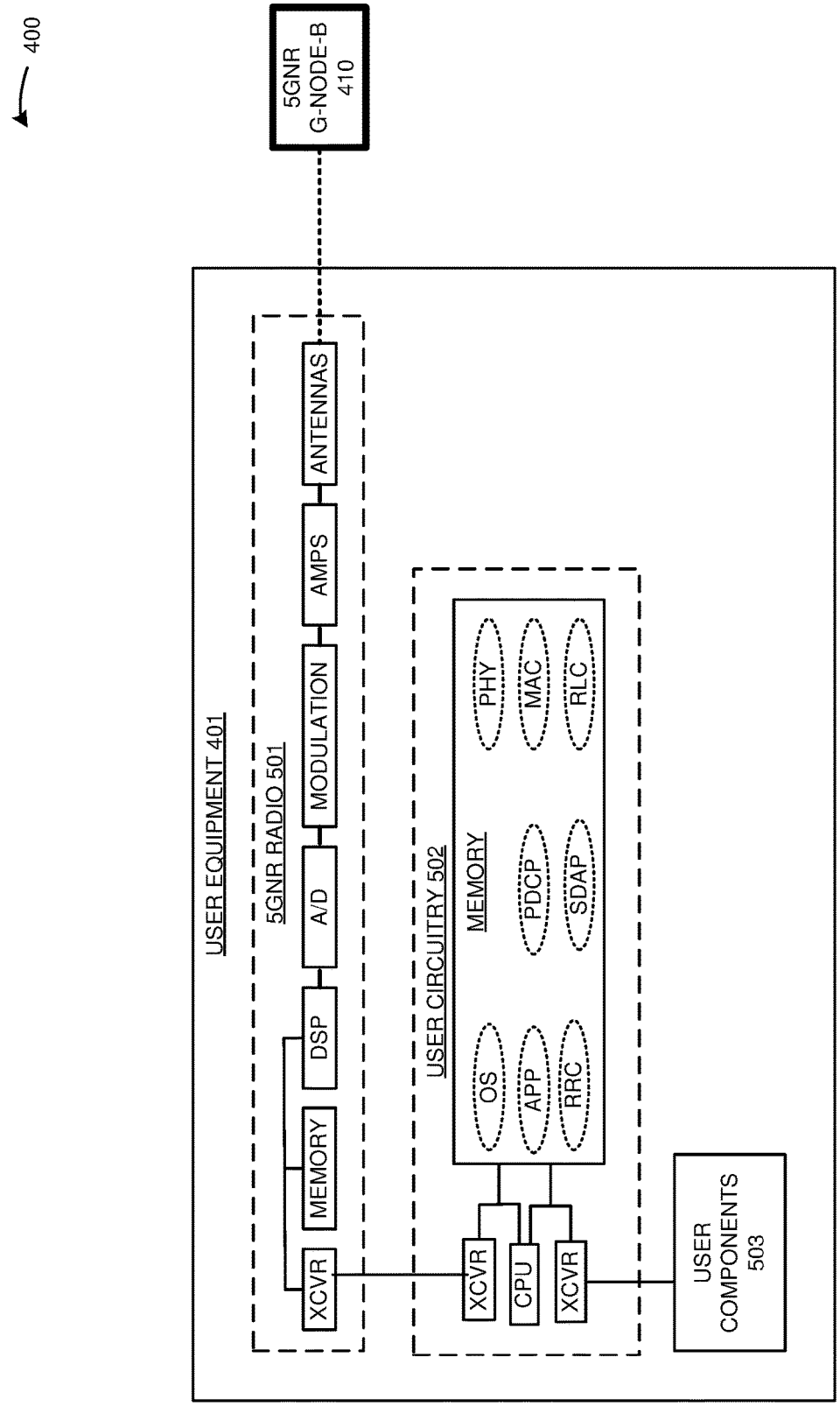
FIG. 5 illustrates an exemplary UE in the 5G wireless communication network.

FIG. 5 illustrates exemplary UE 401 in 5G wireless communication network 400. UE 401 comprises an example of UEs 101-102 and 402-403, although these UEs may differ. UE 401 comprises 5GNR radio 501, user circuitry 502, and user components 502. User components 502 comprise sensors, controllers, displays, or some other user apparatus that generates slice data. 5GNR radio 501 comprises antennas, amplifiers, filters, modulation, analog-to-digital interfaces, DSP, memory, and transceivers that are coupled over bus circuitry. User circuitry 502 comprises memory, CPU, user interfaces and components, and transceivers that are coupled over bus circuitry. The memory in user circuitry 502 stores an operating system (OS), user applications (APP), 5GNR network applications for Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in 5GNR radio 501 are wirelessly coupled to 5GNR gNodeB 410 over a 5GNR link. Transceivers (XCVRs) in 5GNR radio 501 are coupled to transceivers in user circuitry 502. Transceivers in user circuitry 502 are coupled to user components 503. The CPU in user circuitry 502 executes the operating system, user applications, PHY, MAC, RLC, PDCP, SDAP, and RRC to exchange network signaling and user data with 5GNR gNodeB 410 over 5GNR radio 501.

Figure 6:
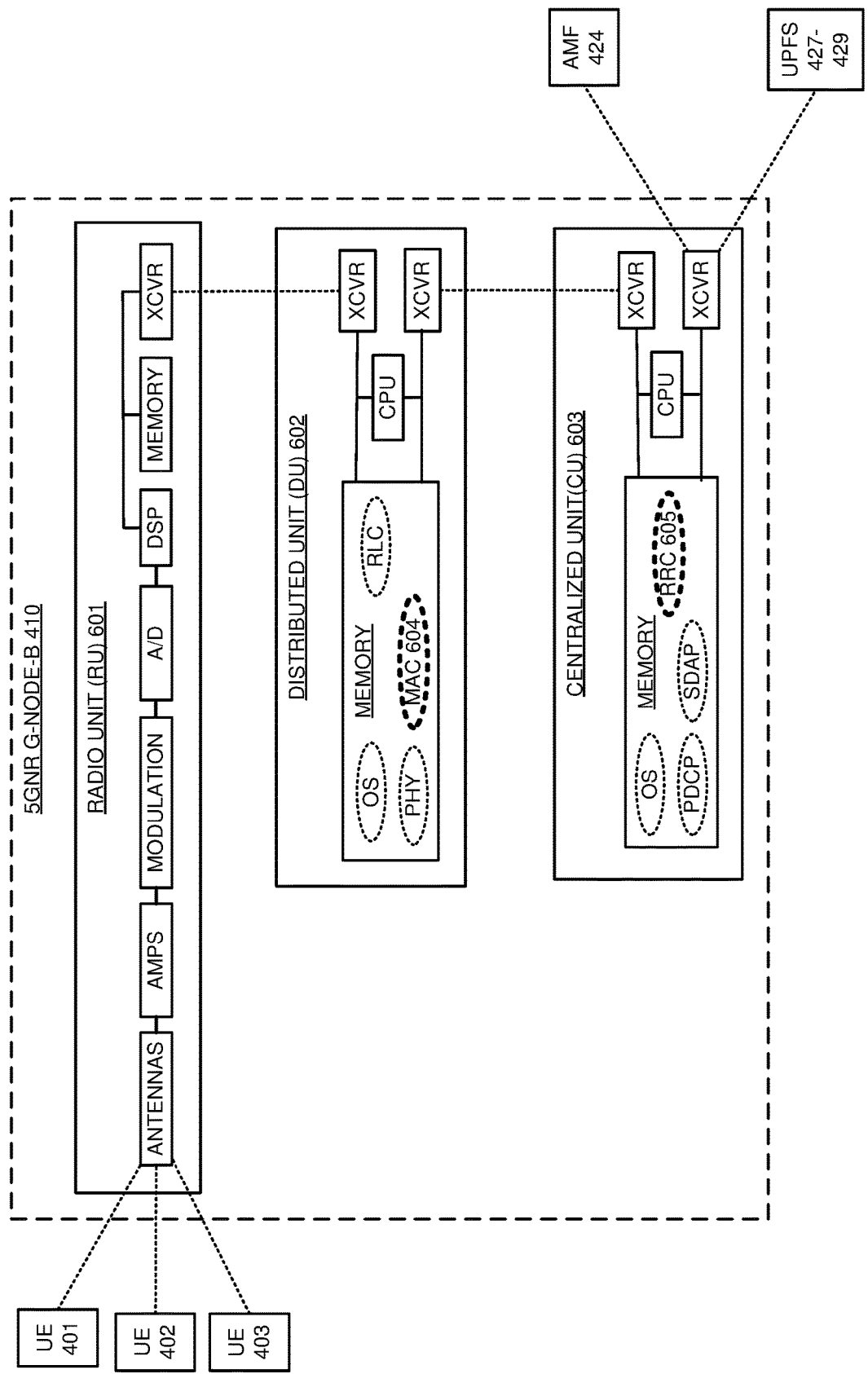
FIG. 6 illustrates an exemplary 5GNR gNodeB in the 5G wireless communication network.

FIG. 6 illustrates exemplary 5GNR gNodeB 410 in 5G wireless communication network 400. 5GNR gNodeB 410 comprises an example of wireless access node 110, although node 110 may differ. 5GNR gNodeB 410 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, and transceivers that are coupled over bus circuitry. The memory in DU 602 stores an operating system, PHY, MAC 604, and RLC. CU 603 comprises memory, CPU, and transceivers that are coupled over bus circuitry. The memory in CU 603 stores an operating system, PDCP, SDAP, and RRC 605. The antennas in RU 601 are wirelessly coupled to UEs 401-403 over 5GNR links. Transceivers in RU 601 are coupled to transceivers in DU 602. Transceivers in DU 602 are coupled to transceivers in CU 603. Transceivers in CU 603 are coupled to AMF 424 and UPFs 427-429. The DSP and CPU in RU 601, DU 602, and CU 603 execute the radio applications, operating systems, PHY, MAC 604, RLC, PDCP, SDAP, and RRC 605 to exchange network signaling and user data with UEs 401-403, AMF 424, and UPFs 427-429.

Figure 7:
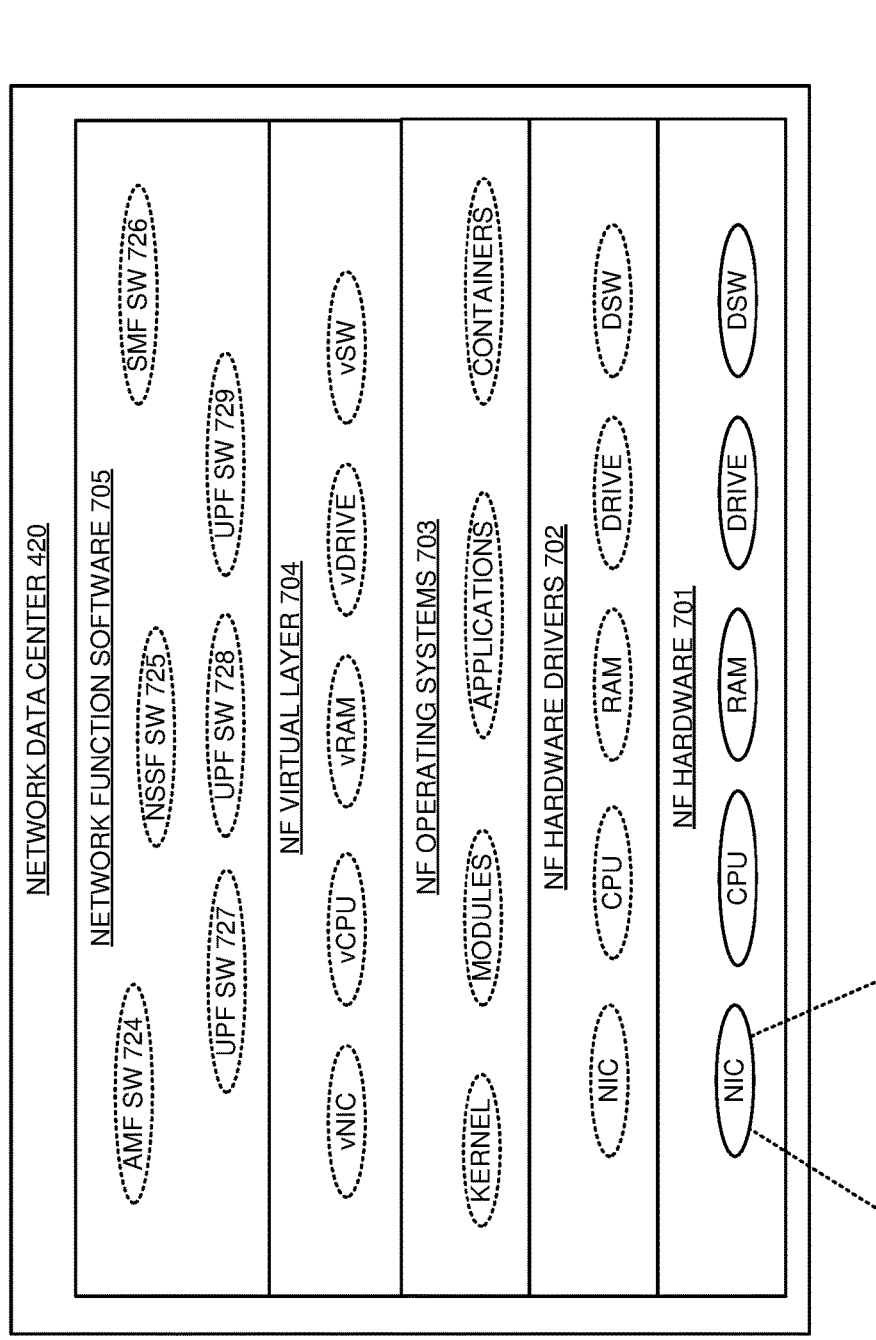
FIG. 7 illustrates an exemplary network data center in the 5G wireless communication network.

FIG. 7 illustrates exemplary network data center 420 in 5G wireless communication network 400. Network data center 420 comprises an example of network slices 121-122, although slices 121-122 may differ. Network data center 420 comprises Network Function (NF) hardware 701, NF hardware drivers 702, NF operating systems 703, NF virtual layer 704, and NF Software (SW) 705. NF hardware 701 comprises Network Interface Cards (NICs), CPU, RAM, Flash/Disk Drives (DRIVE), and Data Switches (DSW). NF hardware drivers 702 comprise software that is resident in the NIC, CPU, RAM, DRIVE, and DSW. NF operating systems 703 comprise kernels, modules, and applications that form containers for virtual layer and NF software execution. NF virtual layer 704 comprises vNIC, vCPU, vRAM, vDRIVE, and vSW. NF SW 705 comprises AMF SW 724, NSSF SW 725, SMF SW 726, and UPF SW 727-729. 729. Other NFs like Authentication Server Function (AUSF) and Network Repository Function (NRF) are typically present but are omitted for clarity. Network data center 420 may be located at a single site or be distributed across multiple geographic locations. The NIC in NF hardware 701 are coupled to 5GNR gNodeB 410 and external systems. NF hardware 701 executes NF hardware drivers 702, NF operating systems 703, NF virtual layer 704, and NFs 705 to form and operate AMF 424, NSSF 425, SMF 426, and UPFs 427-429.

Figure 8:
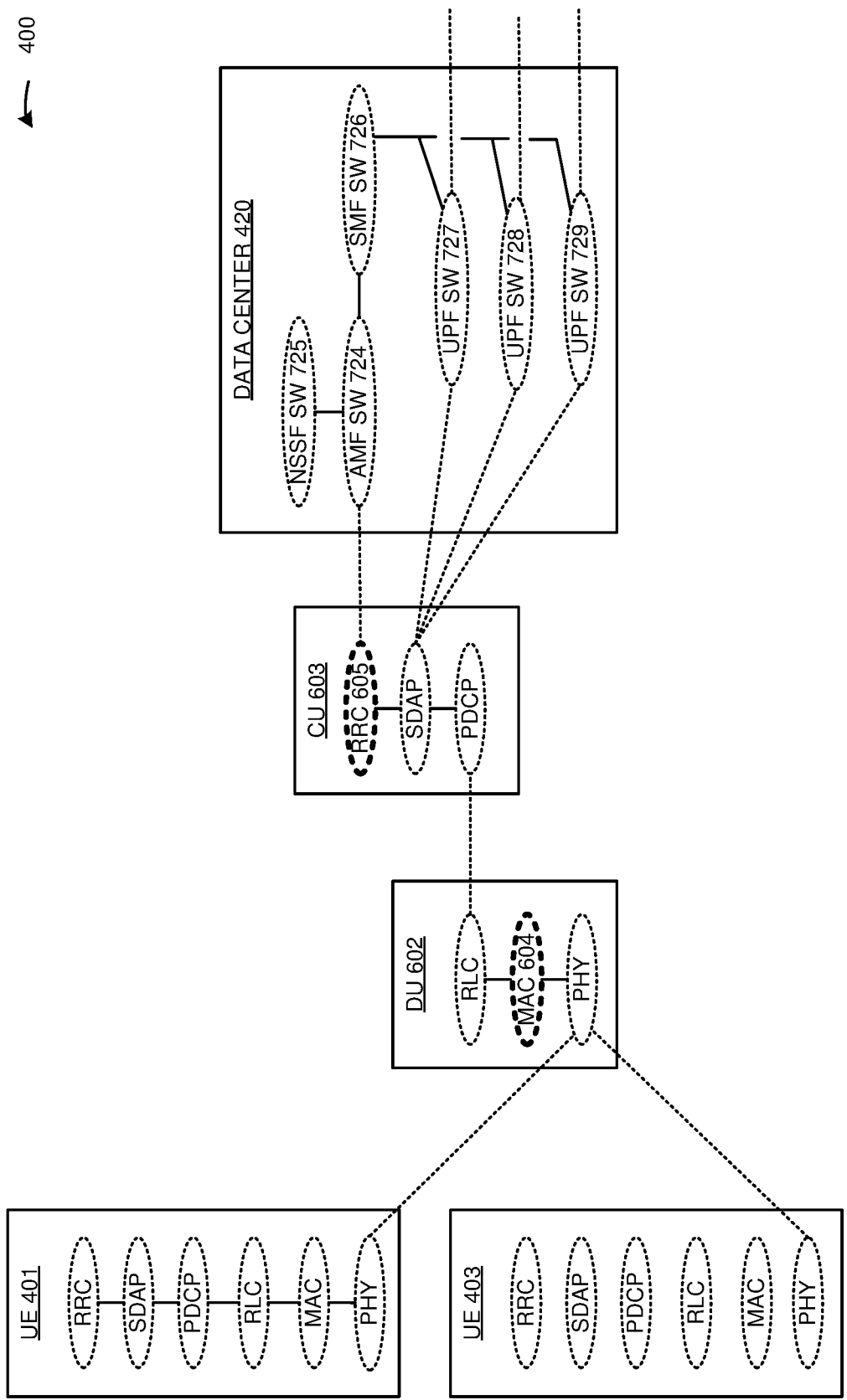
FIG. 8 illustrates an exemplary operation of the 5G wireless communication network comprising the 5GNR gNodeB to serve the wireless UEs based on the wireless network slices that are used by the wireless UEs.

FIG. 8 illustrates an exemplary operation of 5G wireless communication network 400 comprising 5GNR gNodeB 410 to serve wireless UEs 401-403 based on wireless network slices 421-423 that are used by wireless UEs 401-403. The operation may differ in other examples. The RRC in UE 401 wirelessly attaches to RRC 605 in CU 603. RRC 605 transfers initial signaling for UE 401 to AMF SW 724. AMF SW 724 authenticates UE 401. AMF SW 724 and NSSF SW 725 interact to select slices 421-422 for UE 401. AMF SW 724 signals SMF SW 726 to serve slices 421-422 to UE 401 over CU 603. SMF SW 726 signals UPF SW 727-728 to serve UE 401 over CU 603. AMF SW 724 signals RRC 605 in 5GNR gNodeB 410 to serve UE 401 over UPF SW 727-728. RRC 605 signals the RRC in UE 401 to communicate with UPFs 427-428 over 5GNR gNodeB 410. The SDAP in UE 401 exchanges user data with external systems over DU 602, CU 603, and UPF SW 727-728.

The RRC in UE 403 wirelessly attaches to RRC 605 in 5GNR gNodeB 410. RRC 605 transfers initial signaling for UE 403 to AMF SW 724. AMF SW 724 authenticates UE 403. AMF SW 724 and NSSF SW 725 interact to select slice 423 for UE 403. AMF SW 724 signals SMF SW 726 to serve slice 423 to UE 403 over CU 603. SMF SW 726 signals UPF SW 729 to serve UE 403 over CU 403. AMF SW 724 signals RRC 605 in CU 603 to serve UE 403 over UPF SW 729. RRC 605 signals the RRC in UE 403 to communicate with UPF SW 729 over gNodeB 410. The SDAP in UE 403 exchanges user data with external systems over DU 602, CU 603, and UPF SW 729.

To exchange the user data, MAC 604 in DU 602 schedules uplink and downlink resource blocks for UE 401 and UE 403 per the signaling from AMF SW 724. UE 401, UE 403, DU 602, and CU 603 exchange the user data over the scheduled uplink and downlink resource blocks. In this example, UE 401, UE 403, and DU 602 use proactive uplink scheduling where MAC 604 automatically schedules uplink resource blocks to UE 401 and UE 403 without requiring repeated requests. MAC 604 in DU 602 detects contention for the uplink resource blocks between UE 401 and UE 403 when not enough resource blocks are available to serve proactive uplink scheduling to both UE 401 and UE 403. MAC 604 in DU 602 queries RRC 605 in CU 603 to get the slice IDs or slice types for UE 401 and UE 403. RRC 605 in CU 603 transfers the slice IDs or slice types for UE 401 and UE 403 to MAC 604 in DU 603. MAC 604 prioritizes UE 401 and UE 403 for proactive uplink scheduling based on the priority of their slices 421-423. If slices 421-422 (used by UE 401) have priority over slice 423 (used by UE 403) based on slice ID, type, or amount, then UE 401 retains proactive uplink scheduling while UE 403 must request uplink resource blocks. If slice 423 (used by UE 403) has priority over slices 421-422 (used by UE 401) based on slice ID or type, then UE 403 retains proactive uplink scheduling and UE 401 must request uplink resource blocks. When the contention subsides, MAC 604 in DU 602 returns to normal scheduling and both UE 401 and UE 402 receive proactive uplink scheduling.

MAC 604 may host a data structure that correlates slice IDs and/or slice types with proactive uplink scheduling during contention. For example, low-latency slice types and fixed wireless slice types might be prioritized for proactive uplink scheduling during contention over other slice types. During contention, the UEs that use the low-latency slice type or fixed wireless slice type would still receive proactive uplink scheduling, while the UEs that use the other slice types would need to request uplink resource blocks.

Figure 9:
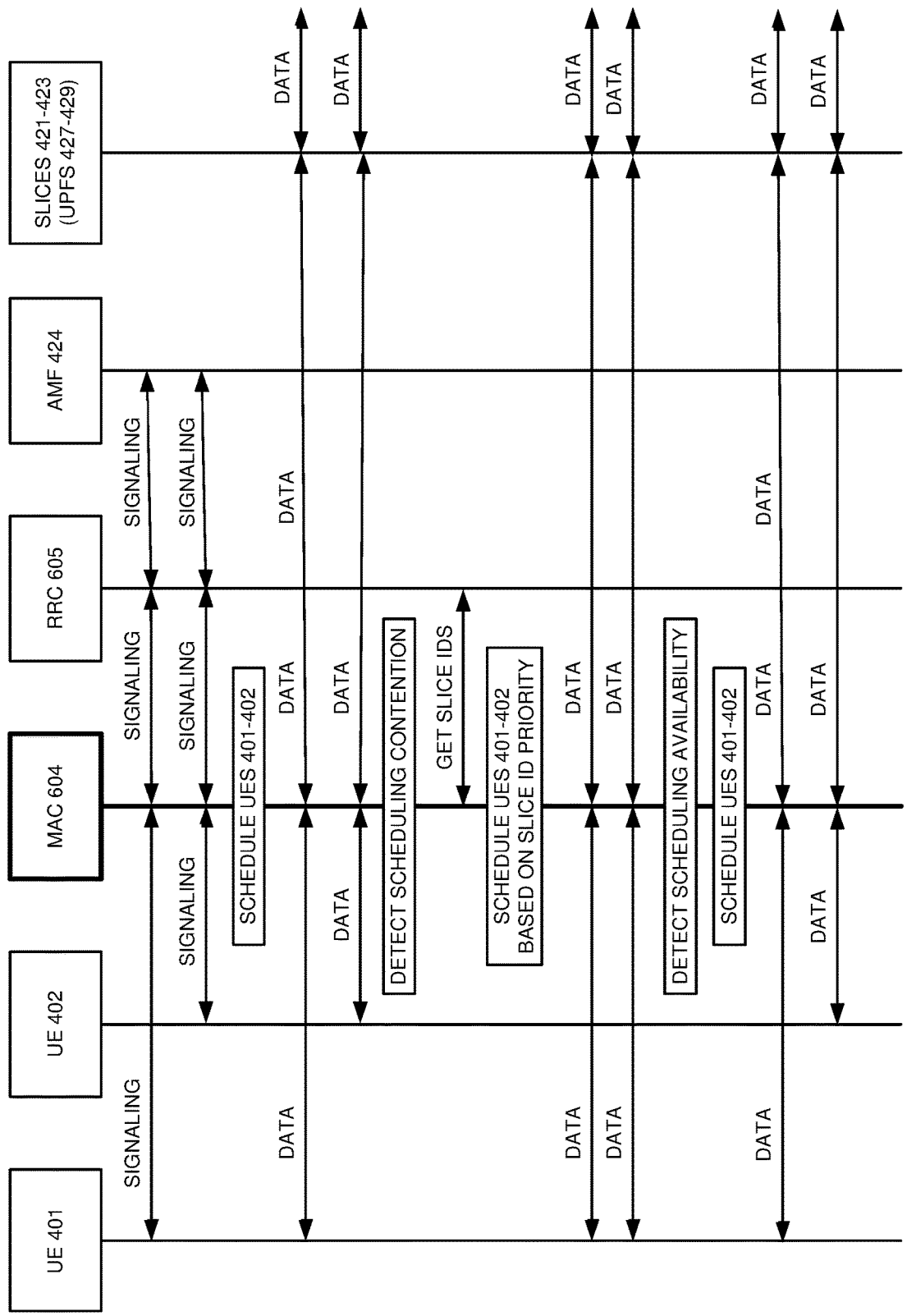
FIG. 9 illustrates an exemplary operation of the 5G wireless communication network comprising the 5GNR gNodeB to serve the wireless UEs based on the wireless network slices that are used by the wireless UEs.

FIG. 9 illustrates an exemplary operation of 5G wireless communication network 400 comprising 5GNR gNodeB 410 to serve wireless UEs 401-403 based on wireless network slices 421-423 that are used by wireless UEs 401-402. The operation may differ in other examples. UE 401 exchanges signaling with RRC 605 over MAC 604. RRC 605 exchanges corresponding signaling for UE 401 with AMF 424. UE 402 exchanges signaling with RRC 605 over MAC 604. RRC 605 exchanges corresponding signaling for UE 402 with AMF 424. MAC 604 proactively schedules uplink resource blocks for UEs 401-402 per the signaling from AMF 424. UE 401 and external systems exchange user data over MAC 604 and slices 421-422 (UPFs 427-428). UE 402 and external systems exchange user data over MAC 604 and slice 422 (UPF 428). MAC 604 detects contention for the uplink resource blocks between UEs 401-402 when not enough resource blocks are available to serve proactive uplink scheduling to both UEs 401-402. MAC 604 queries RRC 605 to get the slice IDs for UEs 401-402. MAC 604 prioritizes UEs 401-402 for proactive uplink scheduling based on the priority of their slice IDs. If slice 421 (used by UE 401) has priority over slice 422 (used by UE 402), then UE 401 retains proactive uplink scheduling while UE 402 must request uplink resource blocks. If slices 421-422 (used by UE 401) have priority over slice 422 (used by UE 402) based on a slice amount, then UE 401 retains proactive uplink scheduling and UE 402 must request uplink resource blocks. In this example, UE 401 has slice priority and exchanges user data with external systems over MAC 604 and slices 421-422 (UPFs 427-428). UE 402 does not receive any resource grants during this period of contention. When the scheduling contention subsides, MAC 604 detects the revived scheduling availability and returns to normal scheduling. Both UEs 401-402 again receive proactive uplink scheduling. UE 401 and external systems exchange user data over MAC 604 and slices 421-422 (UPFs 427-428). UE 402 and external systems exchange user data over MAC 604 and slice 422 (UPF 428).

The wireless data network circuitry described above comprises computer hardware and software that form special-purpose networking circuitry to serve wireless UEs over wireless access nodes based on their wireless network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve wireless UEs over wireless access nodes based on their wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method comprising:
   detecting contention among user devices for wireless resources by detecting a lack of available resource blocks;
   prioritizing individual ones of the user devices based on wireless network slices used by the individual ones of the user devices in response to the contention;
   allocating the wireless resources to the individual ones of the user devices based on the prioritization; and
   wirelessly communicating between the wireless network slices and the individual ones of the user devices over the allocated wireless resources.

2. The method of claim 1 wherein the allocated wireless resources comprise uplink wireless resource blocks.

3. The method of claim 1 wherein the allocated wireless resources comprise downlink wireless resource blocks.

4. The method of claim 1 wherein allocating the wireless resources to the individual ones of the user devices comprises proactively allocating some of the wireless resources to some of the individual ones of the user devices.

5. The method of claim 1 wherein:
   a portion of the wireless network slices comprise a low-latency slice type; and
   prioritizing the individual ones of the user devices comprises giving a higher priority to the individual ones of the user devices that use the portion of the wireless network slices that comprise the low-latency slice type than to the individual ones of the user devices that do not use the portion of the wireless network slices that comprise the low-latency slice type.

6. The method of claim 1 wherein:
   a portion of the wireless network slices comprise a fixed-wireless slice type; and
   prioritizing the individual ones of the user devices comprises giving a higher priority to the individual ones of the user devices that use the portion of the wireless network slices that comprise the fixed-wireless slice type than to the individual ones of the user devices that do not use the portion of the wireless network slices that comprise the fixed-wireless slice type.

7. The method of claim 1 wherein prioritizing the individual ones of the user devices comprises giving a higher priority to the individual ones of the user devices that use a higher amount of the wireless network slices than to the individual ones of the user devices that use a lower amount of the wireless network slices.

8. A method comprising:
a Radio Resource Control (RRC) determining wireless network slices used by individual ones of the user devices;
a Media Access Control (MAC) detecting a lack of available wireless resource blocks and responsively detecting contention among the individual ones of the user devices for the wireless resource blocks;
the RRC indicating the wireless network slices used by the individual ones of the user devices to the MAC;
the MAC prioritizing the individual ones of the user devices based on the wireless network slices used by the individual ones of the user devices in response to the contention; and
the MAC allocating the wireless resource blocks to the individual ones of the user devices based on the prioritization.

9. The method of claim 8 wherein the wireless resource blocks comprise uplink wireless resource blocks.

10. The method of claim 8 wherein the wireless resource blocks comprise downlink wireless resource blocks.

11. The method of claim 8 wherein allocating the wireless resource blocks to the individual ones of the user devices comprises proactively allocating some of the wireless resource blocks to some of the individual ones of the user devices.

12. The method of claim 8 wherein:
a portion of the wireless network slices comprise a low-latency slice type; and
prioritizing the individual ones of the user devices comprises giving a higher priority to the individual ones of the user devices that use the portion of the wireless network slices that comprise the low-latency slice type than to the individual ones of the user devices that do not use the portion of the wireless network slices that comprise the low-latency slice type.

13. The method of claim 8 wherein:
a portion of the wireless network slices comprise a fixed-wireless slice type; and
prioritizing the individual ones of the user devices comprises giving a higher priority to the individual ones of the user devices that use the portion of the wireless network slices that comprise the fixed-wireless slice type than to the individual ones of the user devices that do not use the portion of the wireless network slices that comprise the fixed-wireless slice type.

14. The method of claim 8 wherein prioritizing the individual ones of the user devices comprises giving a higher priority to the individual ones of the user devices that use a higher amount of the wireless network slices than to the individual ones of the user devices that use a lower amount of the wireless network slices.

15. A wireless access node comprising:
node circuitry configured to;
  detect a lack of available resource blocks;
  detect contention among user devices for wireless resources based on the lack of available resource blocks;
  prioritize individual ones of the user devices based on wireless network slices used by the individual ones of the user devices in response to the contention; and
  allocate the wireless resources to the individual ones of the user devices based on the prioritization; and
a radio configured to:
  wirelessly communicate between the wireless network slices and the individual ones of the user devices over the allocated wireless resources.

16. The wireless access node of claim 15 wherein the allocated wireless resources comprise uplink resource blocks.

17. The wireless access node of claim 15 wherein the allocated wireless resources comprise downlink resource blocks.

18. The wireless access node of claim 15 wherein the node circuitry is configured to proactively allocate some of the wireless resources to some of the individual ones of the user devices to allocate the wireless resources to the individual ones of the user devices.

19. The wireless access node of claim 15 wherein:
a portion of the wireless network slices comprise a low-latency slice type; and
the node circuitry is configured to give a higher priority to the individual ones of the user devices that use the portion of the wireless network slices that comprise the low-latency slice type than to the individual ones of the user devices that do not use the portion of the wireless network slices that comprise the low-latency slice type.

20. The wireless access node of claim 15 wherein;
a portion of the wireless network slices comprise a fixed-wireless slice type; and
the node circuitry is configured to give a higher priority to the individual ones of the user devices that use the portion of the wireless network slices that comprise the fixed-wireless slice type than to the individual ones of the user devices that do not use the portion of the wireless network slices that comprise the fixed-wireless slice type.

* * * * *